United States Patent [19]

Stueble

[11] Patent Number: 5,279,629
[45] Date of Patent: Jan. 18, 1994

[54] AIR HANDLING APPARATUS AND METHOD FOR TEXTILE MACHINES

[75] Inventor: Helmut Stueble, Spartanburg, S.C.

[73] Assignee: LTG Lufttechnische GmbH, Spartanburg, S.C.

[21] Appl. No.: 23,588

[22] Filed: Feb. 26, 1993

[51] Int. Cl.⁵ .............................................. B01D 46/10
[52] U.S. Cl. ........................................ 95/284; 95/287; 55/262; 55/323; 55/343; 55/471; 55/472; 55/484
[58] Field of Search ................ 55/97, 213, 261, 262, 55/315, 318, 321, 323, 324, 342, 471, 472, 484, 343

[56] References Cited

U.S. PATENT DOCUMENTS

| | | |
|---|---|---|
| 385,899 | 3/1888 | Allfree . |
| 1,842,316 | 1/1932 | Coulter . |
| 3,412,545 | 11/1968 | Lippuner . |
| 3,762,143 | 10/1973 | Stewart . |
| 3,951,623 | 4/1976 | Furstenberg .................. 55/484 X |
| 4,217,116 | 3/1980 | Seever . |
| 4,494,375 | 1/1985 | Rao et al. . |
| 4,502,874 | 3/1985 | Levie et al. . |
| 4,681,604 | 7/1987 | Niederer . |
| 4,778,491 | 3/1988 | Yow, Sr. . |
| 4,857,090 | 8/1989 | Hartness . |
| 4,895,581 | 1/1990 | Starling ............................ 55/213 X |
| 5,174,797 | 12/1992 | Yow et al. ...................... 55/484 X |

FOREIGN PATENT DOCUMENTS 982604 2/1965 United Kingdom .

Primary Examiner—Charles Hart
Attorney, Agent, or Firm—Dority & Manning

[57] ABSTRACT

An air handling and filtering system is provided for with conventional textile machines. The apparatus includes a common vacuum system for drawing first and second independent airstreams through the textile machines. A filtering system operates with the vacuum system to filter the useful white waste fiber material from all of the first airstreams. Individual filtering devices are provided for each textile machine and are housed in end-housing units disposed as one end of the textile machine. The individual filtering devices filter generally waste fiber material from the second airstreams drawn through the textile machines. The individual filtering devices can be isolated from the common vacuum system so that the individual waste fiber filters can be cleaned without stopping or otherwise affecting the critical first airstream so as not to detrimentally affect yarn formation at the spinning stations of the textile machines.

24 Claims, 3 Drawing Sheets

AIR HANDLING APPARATUS AND METHOD FOR TEXTILE MACHINES

BACKGROUND OF THE INVENTION

The present invention relates to an air handling and filtering system, and more particularly to an air cleaning system for use with textile spinning machines.

With modern textile machines, particularly air spinning machines and open-end spinning machines, a significant amount of dust, fly, and fiber material in general are generated during the yarn spinning process. The fly and fiber material consists essentially of two types: waste fiber material that is generally of little value, and reusable fiber material (also referred to as "white waste") which is far more valuable and useful. However, the present methods for separately drawing and filtering the two types of fiber material has proven inefficient and detrimental to yarn spinning.

It is very important during yarn formation, particularly in open-end and air spinning machines, that a continuous suction exists at the yarn formation area at each spinning station to remove waste or excess fiber material that is not spun into yarn. If not removed, this fiber material adversely affects the yarn quality. With known textile machines, independent internal ducting is generally supplied for establishing two suction airstreams along the spinning stations of the textile machine. An exhaust fan is generally supplied with each textile machine located in an end-housing thereof for drawing the two airstreams through the internal ducting. At least one of the ducting systems is configured for continuously removing the critical white waste from the area of yarn formation, while another ducting system removes waste fiber material in general. The waste fiber material can be generated from any number of processes, such as piecing up after yarn breakage or bobbin replacement, etc. Filtering devices are generally supplied in the end-housing unit for filtering the waste fiber and white waste. However, with the known arrangements, in order to clean the waste fiber filter it is necessary to shut off the exhaust fan during the cleaning operation while the waste matte is pulled from the filter. This operation takes approximately one minute. Meanwhile, the textile machine is still running at full capacity with yarn being produced at approximately 300 meters/minute at 72 independent spinning stations. During the critical one minute while the waste filter is being cleaned, the suction at the yarn formation area of each spinning station is interrupted and the yarn being produced during that time is inferior. Approximately 21,000 meters of inferior yarn is produced at the 72 spinning stations due to the cleaning operation of the waste filter.

Also, with the conventional arrangement the white waste filter and waste filter were generally arranged in series, or at least share a common exhaust fan. Thus, while the fan is shut down for cleaning of one filter, the other filter would also be cleaned whether it needed it or not. If the white waste filter alone needed cleaning, the same problem exists in that the fan has to be secured in order to pull and clean the filter. During this critical time, the continuous suction at the spinning stations is interrupted.

Another notable problem and health concern within modern textile mills is the noise level generated therein. A significant portion of the noise is generated by the air filtering and ventilation system for each textile machine. From a safety and health standpoint, it is always desired to reduce the noise level in the mills without affecting air filtering or yarn quality.

OBJECTS AND SUMMARY OF THE INVENTION

It is therefore a principle object of the present invention to provide an improved air filtering system for textile machines which is not detrimental to yarn quality during cleaning of air filters.

Another principle object of the present invention is to provide a more versatile air handling and filtering system which maintains a relatively constant negative pressure at the spinning stations during all phases of operation.

Yet another principle object of the present invention is to provide an air filtering system which substantially reduces noise levels within the textile mill.

And still a further object of the present invention is to provide an arrangement for selectively cleaning the waste filter of a textile machine without securing or shutting off the suction supply for the usable or white waste filter.

A further principle object of the present invention is to provide a more energy efficient air handling and filtering system for textile machines.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an air handling apparatus is provided for use with textile machines of the type having a row of spinning stations and independent fiber conveying ducts adjacent to spinning stations, such as an air spinning machine. Generally, with textile machines of this type, one of the conveying ducts is for drawing generally useable fiber material from the spinning stations and another of the conveying ducts is for drawing generally waste fiber material from the spinning stations, it being desired to separately filter the useable fiber material and waste fiber material without adversely affecting yarn production. The present apparatus includes a common vacuum system for drawing first and second independent airstreams through the fiber conveying ducts of the textile machine. In one preferred embodiment, the common vacuum system may comprise a fan disposed in the end-housing unit adjacent each textile machine or, in an alternative preferred embodiment, the common vacuum system may comprise a centralized vacuum system or fan for drawing the first and second airstreams from a plurality of the textile machines.

The present apparatus also includes a filtering system in pneumatic communication with the common vacuum system. The filtering system filters fiber material from the first and second airstreams drawn from the textile machines and includes a first filter for filtering fiber material from the first airstream, and a second filter for separately filtering fiber material from the second airstream with the common vacuum system drawing both the first and second airstreams through their respective filters. In one preferred embodiment of the invention, the filtering system comprises a centralized filtering system for filtering the first airstreams from a plurality of textile machines. In this embodiment, the centralized filtering system is connected to the textile machines through appropriate ducting. Any number of known filtering systems, such as a drum type filter, may be utilized as the centralized filtering system.

The present apparatus also includes an isolation device, such as a damper, disposed so as to selectively isolate the second filter from the common vacuum system. In this manner, the second filter can be isolated for maintenance or servicing thereof while the common vacuum system continues to draw the first airstream from the textile machine so as not to adversely affect yarn production at the spinning stations.

In an alternative preferred embodiment of the invention, the common vacuum comprises a centralized vacuum for drawing the first and second airstreams from a plurality of textile machines, and the first filter comprises a centralized filtering system for filtering the first airstream from the plurality of textile machines. Preferably, the centralized vacuum and centralized filtering system are housed in a common housing structure generally remote from the textile machines. In this manner, a single fan or vacuum source services a plurality of textile machines thereby significantly reducing the noise level within the spinning mill. In this embodiment, the second filter may comprise individual filters disposed in the housing structure generally adjacent the end of each textile machine with the isolation device comprising a damper disposed generally adjacent the individual filters so as to isolate the filters from the centralized fan or vacuum system. In an alternative embodiment, the second filter may comprise another centralized common filtering system similar to the first airstream centralized filtering system so that a single filtering system can filter the second airstreams from a plurality of textile machines.

In the embodiment wherein individual filters are provided with each textile machine for filtering the second airstream, the second airstream may combine with the first airstream and be drawn through the centralized filtering system only after the second airstream has been separately filtered by the second airstream filter.

In yet another preferred embodiment of the present invention, the apparatus further includes an auxiliary vacuum and filtering system for drawing both the first and second airstreams and filtering the first airstream. The auxiliary vacuum and filter are isolated from the common vacuum source and first airstream filter by means of an isolation device or damper. With the common vacuum and first airstream filter isolated, the auxiliary vacuum draws the first airstream through the auxiliary first airstream filter and draws the second airstream through the second airstream filter. In a preferred embodiment, the auxiliary vacuum and filtering system may comprise a centralized auxiliary vacuum and filtering system for providing the auxiliary services to a plurality of the textile machines. In the embodiment wherein the common vacuum system and first airstream filter comprise a centralized vacuum and filtering system, the auxiliary vacuum and filtering system comprises a fan housed within the textile machine end-housing unit and an individual first airstream filter associated therewith. The auxiliary fan and filter can be isolated from the centralized vacuum and filtering system through a damper in the ducting leading to the centralized system.

In further accordance with the objects and purposes of the invention, an air handling and filtering system is provided for servicing a plurality of textile machines having a row of spinning stations so that separate airstreams can be drawn and filtered from the textile machines without interrupting the critical airstream removing generally reusable fiber material from adjacent the spinning components of the textile machine. This air handling and filtering system comprises a centralized filter house which is generally remote from the textile machines. The filter house further comprises a fan in pneumatic communication with the textile machines for drawing the first and second airstreams therefrom. A first filtering device is disposed in the centralized filter house for filtering the reusable fiber material from all the first airstreams drawn from the textile machines. An end-housing unit is provided generally adjacent the end of each of the textile machines with the centralized filter house being connected thereto by ducting so that the first airstreams are drawn through the end-housing structure to the first filtering device located in the centralized filter house. The centralized fan also draws the second airstream from all the textile machines into the end-housing units of the textile machines. A second airstream filter is disposed within each of the end-housing units for filtering the waste fiber material from each of the second airstreams. An isolation damper is disposed within each of the end-housing units for isolating the second airstream filter from the centralized filter house so that during cleaning or maintenance of the second airstream filter, the centralized fan will continuously drawn the first airstream for all of the textile machines.

In a preferred embodiment, the system further comprises an auxiliary fan and filter housed within the end-housing unit of each textile machine. The auxiliary fan and filter can be isolated from the centralized filter house with an appropriate isolation damper so that the auxiliary fan and filter can provide alternate means for drawing and filtering the first airstream and draw the second airstream through the second airstream filter.

In further accordance with the purposes of the invention, a method is provided for separately filtering two independent airstreams from a plurality of textile machines for filtering generally useable fiber material and generally waste fiber material without adversely affecting yarn formation at the textile machine spinning stations. The method includes the step of drawing first and second airstreams through the textile machines with a common vacuum source, the first airstream conveying the useable fiber material and the second airstream conveying the waste fiber material. The method further includes filtering the first airstream with a first airstream filter and separately filtering the second airstream with a separate second airstream filter. The method also includes isolating the second airstream filter from the common vacuum source when necessary for servicing the second airstream filter without affecting the first airstream being drawn from the textile machine.

In a preferred embodiment of the present method, an auxiliary fan is started and the common vacuum source and first airstream are isolated through, for example, a damper device. The auxiliary fan draws the first and second airstreams from the textile machine with the first airstream being filtered through the auxiliary filter and the second airstream being filtered through the same second airstream filter. In this manner, the first airstream filter and common vacuum source are isolated for servicing thereof without affecting drawing of the first airstream from the textile machine.

The accompanying drawings which are incorporated in and constitute a part of the specification, illustrate one embodiment of the invention and, together with the description, serve to explain the principles of the invention.

DETAILED DESCRIPTION OF THE PREFERRED EMBODIMENTS

Figure 1:
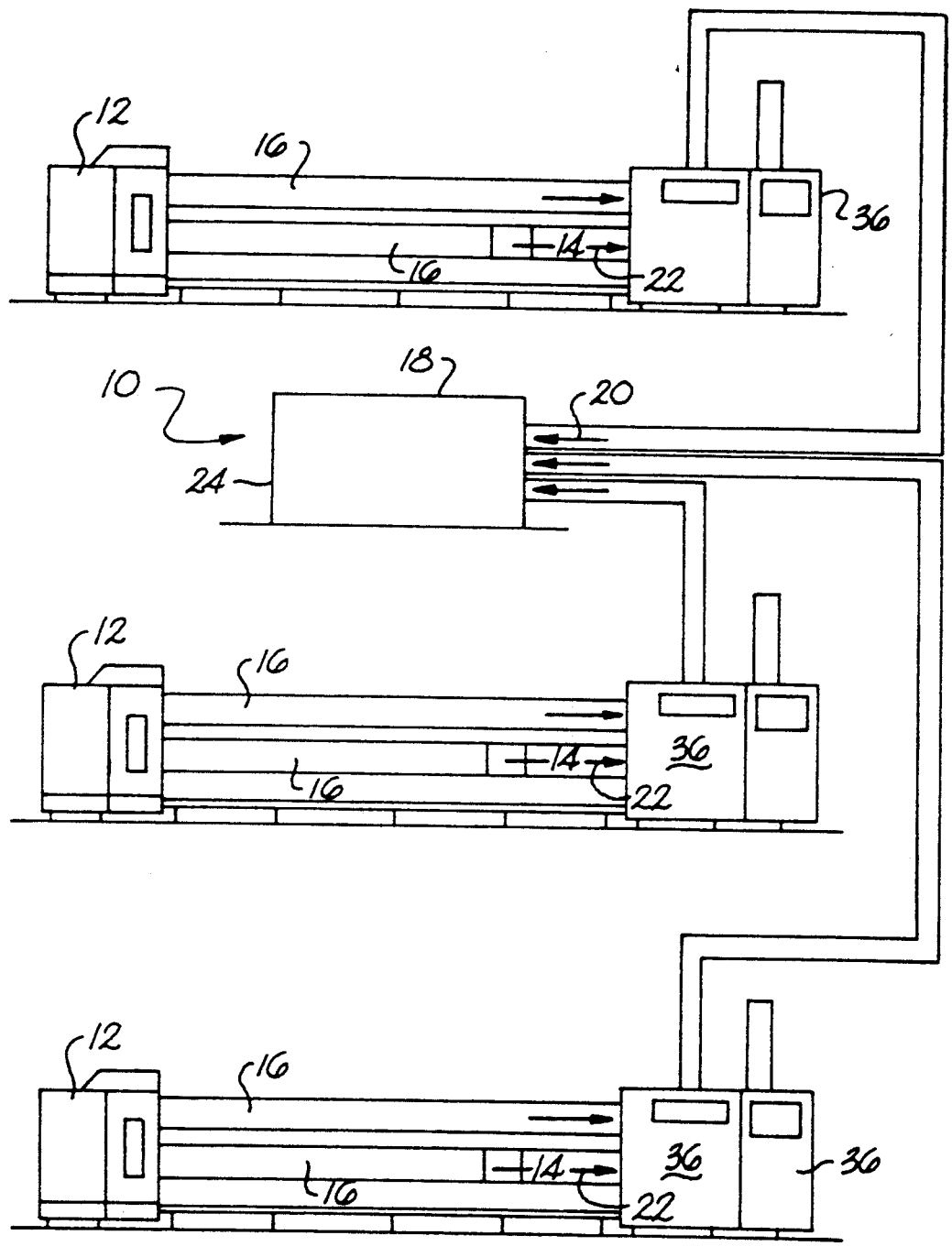
FIG. 1 is a schematic representation of the air handling system according to the invention shown in use with three textile machines.

Reference will now be made in detail to the present preferred embodiments of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

In accordance with the present invention, and as illustrated generally in FIG. 1, an air handling apparatus 10 is provided for use with a plurality of textile machines 12. The textile machines are generally of the type having rows of spinning stations 14, such as an open-end spinning machine or a jet spinning machine. These type of textile machines are well known in the art and need not be described in detail herein. Textile machines 12 are of the type that generally require the drawing and conveying of separate airstreams therethrough. This can be accomplished, for example, by internal ducting 16 running generally lengthwise along textile machine 12. A vacuum or negative pressure is drawn within ducting 16 through at least two independent channels, as shown generally in FIG. 1. Each spinning station 14 is pneumatically in communication with the internal ducting 16. At least one of ducts 16 is configured for conveying generally usable fiber material (white waste) from the yarn formation area of each spinning station 14. As described above, it is essential to quality yarn formation that this fiber material be continuously conveyed away from the yarn formation area so as not to detrimentally affect yarn formation. Another of the ducts 16 is configured for conveying generally waste fiber material away from each spinning station 14. This waste fiber material can be generated, for example, from piecing operations or cleaning of spinning components. An example of a textile machine for which the present air handling apparatus 10 can be configured with is the Murata Jet Spinner No. 802.

Figure 2:
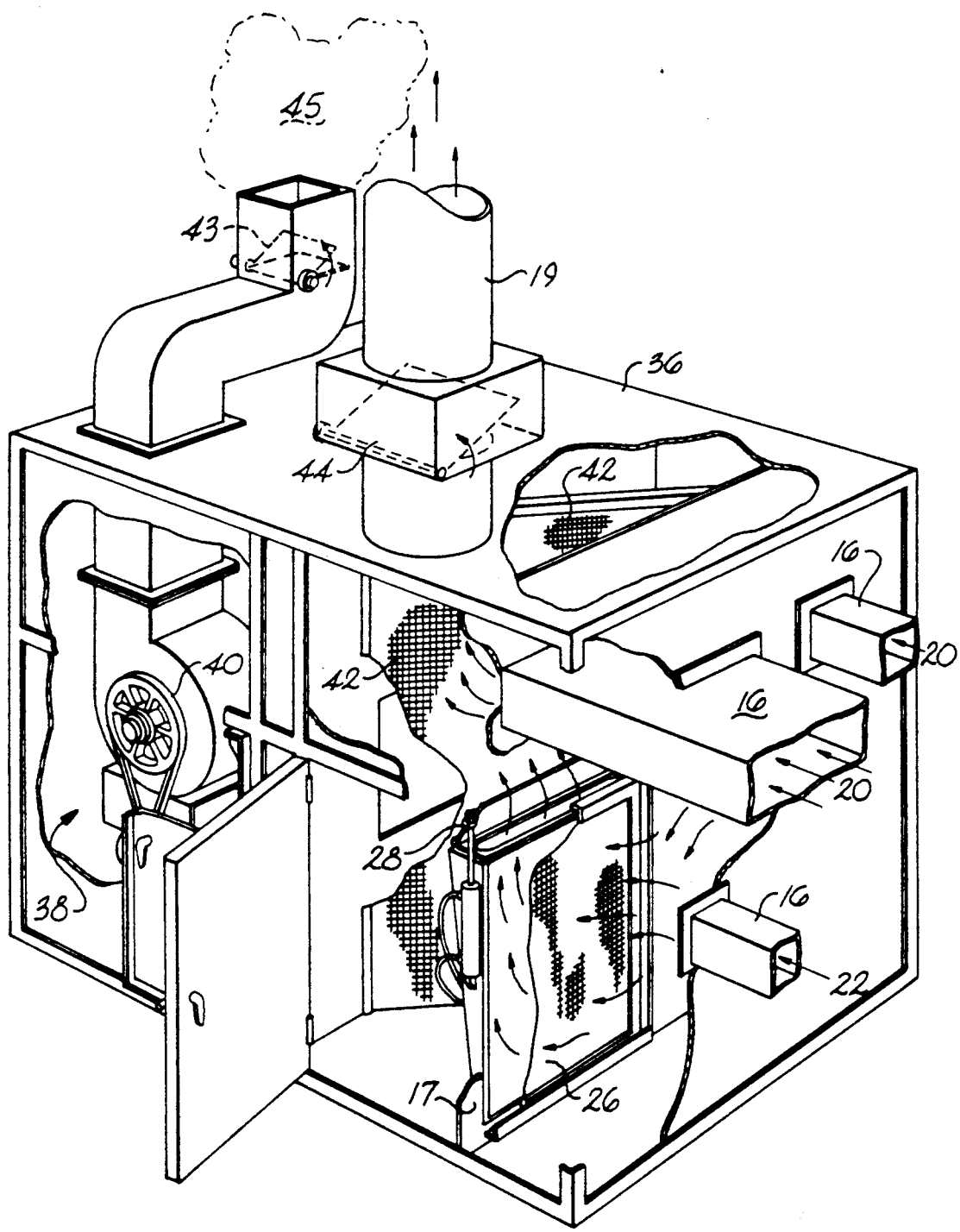
FIG. 2 is a perspective component view of a portion of the air handling and filtering apparatus according to the invention.

Referring to FIG. 2 particularly, apparatus 10 of the present invention includes a common vacuum system. In the embodiment illustrated, fan 40 within end-housing structure 36 acts as the common vacuum system for drawing first airstream 20 and second airstream 22 into structure 36 through appropriate ducting 16. First airstream 20 is the critical airstream conveying the useable fiber material and second airstream 22 conveys the waste fiber material from the textile machine. It should be understood, however, that the airstreams are interchangeable in this explanation and are particularly labeled and described herein for ease of explanation.

Figure 3:
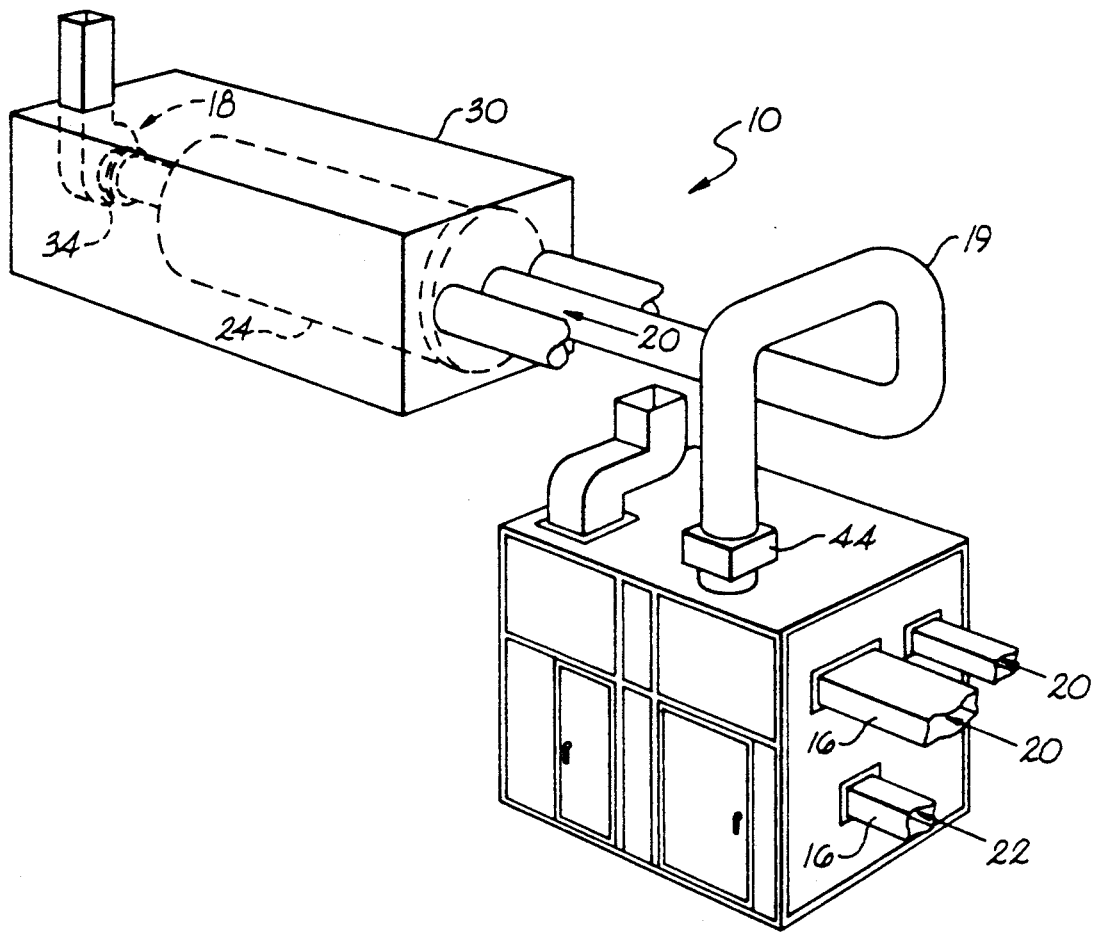
FIG. 3 is a partial perspective view of the components of the air handling apparatus according to the invention.

In the embodiments illustrated generally in FIGS. 1 and 3, the common vacuum system comprises centralized vacuum system 18. Vacuum system 18 is in pneumatic communication with a plurality of textile machines 12 through appropriate ducting or like structure. In this embodiment, system 18 draws first and second independent airstreams 20 and 22 respectively from the textile machines through fiber conveying ducts 16. System 18 preferably comprises an exhaust fan 34, as shown in FIG. 3. Fan 34 is of sufficient strength and horsepower to draw both first and second airstreams from a plurality of textile machines 12. For example, it has been found that to service fifteen of the Murata type air spinning machines, fan 34 should be about 100 h.p. in size.

Apparatus 10 according to the invention further calls for a filtering system in pneumatic communication with the common vacuum system. The filtering system filters fiber material from first airstream 20 and second airstream 22 drawn from the textile machine. In the embodiment of FIG. 2, the filtering system comprises first filter 42 for filtering fiber material from first airstream 20. A second independent filter 26 is provided for separately filtering fiber material from second airstream 22. Fan 40 draws both the first and second airstreams through their respective filters, as illustrated in the figure. The upper set of ducts 16 conveying first airstream 20 discharge into housing structure 36 at a point past second airstream filter 26. In this manner, first airstream 20 is drawn past filter 26 and through first airstream filter 42 by fan 40. Lower duct 16 discharges second airstream 22 in front of second airstream filter 26 so that fan 40 draws the second airstream through filter 26. As illustrated, once second airstream 22 has been filtered through filter 26, it combines with the first airstream and is drawn through first airstream filter 42. It should be understood that the two distinct airstreams 20 and 22 do not admix until the waste fiber material has been separately filtered from second airstream 22.

Apparatus 10 further includes an isolation device, such as damper 28 illustrated in FIG. 2, for isolating second airstream filter 26 from the common vacuum system. Preferably, damper 28 is pneumatically or mechanically driven. In an alternative embodiment, damper 28 could be manually operated. In FIG. 2, damper 28 is shown in its open position so that second airstream 22 is drawn through filter 26 and then through filter 42.

The arrangement of components within housing structure 36 illustrated in FIG. 2 is but a mere example of any suitable arrangement. For example, housing structure 36 may be internally divided by walls or like structure with individual filter 26 being disposed in a first chamber and first airstream filter 42 being disposed in a second chamber with ducting 16 passing through the first chamber to discharge first airstream 20 into the second chamber. Countless variations are possible for routing and filtering the airstreams through housing structure 36.

The arrangement according to the present invention allows for cleaning of the individual waste filter 26 without the necessity of securing the first airstream 20 being drawn from the critical yarn spinning area of the textile machine. In order to clean filter 26, damper 28 is shut which isolates filter 26 from the suction forces of fan 40. Although shown substantially in cut-away for illustrative purposes, wall 17 within housing structure 36 extends down to the top of filter 26 with damper 28 opening behind wall 17. In this manner, when damper 28 is shut the air flow for second airstream 22 is blocked. With damper 28 closed, filter 26 can be removed from housing structure 36 through the door panel provided. The mat of waste fiber material can be stripped from filter 26 and the filter can immediately be placed back in the system. Once this is done, damper 28 can be opened and the system returns to its normal operating configuration. Hence, fan 40 and the filtering of first airstream 20 need not be shut down to service waste fiber filter 26 and the critical suction at the yarn formation area in the textile machine remains continuous throughout the cleaning operation.

In the embodiments of FIGS. 1 and 3, a centralized filtering system 24 is provided for filtering at least the first airstreams from a plurality of textile machines. Centralized filtering system 24 can be of any variety of conventional filters such as a screen filter, mesh filter, compressed air filter, and the like. In a preferred embodiment, centralized vacuum system 18 and centralized filtering system 24 comprise a drum type filtering system 32 as particularly illustrated in FIG. 3. A conventional known drum filter system for use with the present apparatus would be the drum filter marketed by LTG Technologies, Inc. of Spartanburg, S.C. Preferably, the centralized vacuum and filtering systems are housed in a common structure 30 which is generally remote from the textile machines 12. For example, in a conventional textile mill where a great many textile machines are generally arranged in parallel rows throughout the hall, centralized filtering and vacuum system 24 and 18 respectively could be pneumatically connected to fifteen of the textile machines. The housing structure 30 for the centralized system could be disposed, for example, above the textile machines. If the centralized vacuum system, such as fan 34, is used as the common vacuum system to service a plurality of textile machines, the noise level within the textile mill is significantly reduced since a single fan can now service a great number of textile machines thereby eliminating the individual fan noise from fan 40 of each textile machine. To reduce the noise level even further, structure 30 for the centralized system could be located in a building or room outside of the spinning hall.

Although not illustrated in the figures, it should be further understood that the filtering system for filtering second airstreams 22 may also comprise a centralized type system as described above for filtering first airstreams 20. For example, a second drum type filter system 24 may be provided for filtering the combined second airstreams from a plurality of the textile machines. In this embodiment, a damper 28 or other suitable isolation device would be provided for isolating the second centralized filtering system from the centralized vacuum system 18.

Preferably, apparatus 10 is provided with an auxiliary fan and filter for providing continuous drawing and filtering of the first airstream 20 in the event that the common vacuum source and first airstream filter are isolated for servicing. Referring to FIG. 2, the auxiliary fan and filtering system could be connected to the embodiment illustrated through duct 19 and isolation damper 44. The auxiliary vacuum and filtering system could comprise a centralized fan and filtering system as illustrated in FIG. 3. Thus, it should be understood, that in one embodiment, the centralized fan and filtering system comprises the common vacuum source and first airstream filter, and in an alternative embodiment, the centralized system can comprise the auxiliary fan and filtering system. Likewise, referring to FIG. 2, in one embodiment fan 40 comprises the common vacuum system with filter 42 comprising the first airstream filter and, in an alternative embodiment, fan 40 and 42 would comprise the auxiliary fan and filtering system if the textile machine is in communication with a centralized common vacuum system as in FIGS. 1 and 3.

Referring to FIGS. 2 and 3 wherein a centralized common vacuum system is utilized, fan 40 and 42 would comprise the auxiliary system. In normal operating conditions, damper 44 would be open so that fan 34 draws first and second airstreams 20 and 22 respectively through housing structure 36 and duct 19. As discussed, second airstream 22 is filtered through filter 26 before admixing with first airstream 20 and being drawn to centralized filter 24. In the event that the centralized system must be shut down for servicing, it is imperative to continue drawing and filtering of first airstream 20. In this event, auxiliary fan 40 would be started and damper 44 shut to isolate the centralized system from housing structure 36. Fan 40 would draw first airstream 20 through auxiliary filter 42 and second airstream 22 through filter 26. The second airstream would also be drawn through filter 42 after being filtered. Fan 40 would exhaust the air streams through isolation device 43 and preferably into another containment device, such as a bag or filter 45 conceptually illustrated in FIG. 2 by the dashed lines. Filter 45 aids in reducing the fine particulate airborne matter exhausted into the textile mill. Once the centralized system is brought back on line, damper 44 is open and fan 40 is secured. The airstreams are then drawn back through the centralized filter 24 and the system returns to its normal operating configuration.

In the alternative embodiment wherein fan 40 is the common vacuum system and the centralized system comprises the auxiliary vacuum and filtering system, under normal operating conditions, damper 44 is closed. When it becomes necessary to service fan 40 or filter 42, it is imperative to maintain the drawing and filtering of first air stream 20. In this event, auxiliary fan 34 is started and damper 44 is opened to draw the airstreams through duct 19 into central filtering device 24. The second airstream 22 is filtered through filter 26 and also drawn through duct 19. The system is return to its normal operating configuration merely by starting fan 40, replacing filter 42, and shutting damper 44.

It will be apparent to those skilled in the art that various modifications and variations can be made in the apparatus and method of the present invention without departing from the scope or spirit of the invention. For example, the arrangement of filters and fans can take on a countless number of variations and still remain within the scope of the appended claims. Thus, it is intended that the present invention cover the modifications and variations of the invention provided they come within the scope of the claims and their equivalents.

What is claimed is:

1. An air handling apparatus for use with textile machines of the type having a row of spinning stations and independent fiber conveying ducts adjacent the spinning stations, wherein one of the conveying ducts is for drawing generally useable fiber material from the spinning stations and another of the conveying ducts is for drawing generally waste fiber material from the spinning stations, it being desired to separately filter the useable fiber material and waste fiber material without adversely affecting yarn production, said system comprising:

a common vacuum system, said common vacuum system for drawing first and second independent airstreams through the fiber conveying ducts of said textile machines;

a filtering system in pneumatic communication with said common vacuum system, said filtering system for filtering fiber material from said first and second airstreams drawn from said textile machines, said filtering system further comprising:

a first filter for filtering fiber material from said first airstream; and a second filter for separately filtering fiber material from said second airstream, said common vacuum system drawing both said first and second airstreams through said first and second filters respectively; and an isolation device disposed so as to selectively isolate said second filter from said common vacuum system for maintenance thereof while said common vacuum system continuously draws said first airstream from said textile machine so as not to adversely affect yarn production at the spinning stations.

2. The apparatus as in claim 1, wherein said apparatus is configured with a jet spinner textile machine.

3. The apparatus as in claim 1, wherein said apparatus is configured with a textile machine requiring separate filtering of at least two essentially independent airstreams.

4. The apparatus as in claim 1, wherein said common vacuum system comprises a centralized vacuum for drawing said first and second airstreams from a plurality of said textile machines.

5. The apparatus as in claim 4, wherein said centralized vacuum comprises a fan of sufficient power to service approximately fifteen textile machines.

6. The apparatus as in claim 1, wherein said first filter comprises a centralized filtering system for filtering said first airstreams from a plurality of said textile machines.

7. The apparatus as in claim 6, wherein said centralized filtering system comprises a drum type filter having sufficient capacity to service approximately fifteen textile machines.

8. The apparatus as in claim 1, wherein said common vacuum system comprises a centralized vacuum for drawing said first and second airstreams from a plurality of said textile machines, and said first filter comprises a centralized filtering system for filtering said first airstreams from a plurality of said textile machines, said centralized vacuum and said centralized filtering system being housed in a common housing structure generally remote from said textile machine.

9. The apparatus as in claim 1, wherein said second filter comprises an individual filter device disposed in a housing structure generally adjacent the end of each textile machine, and said isolation device comprises a damper disposed generally adjacent said individual filter.

10. The apparatus as in claim 9, wherein said damper comprises a manual damper.

11. The apparatus as in claim 9, wherein said damper comprises a power assisted damper.

12. The apparatus as in claim 1, further comprising an auxiliary vacuum and filtering system for drawing and filtering said first airstream, said auxiliary system acting as back-up to said common vacuum system and said first filter.

13. The apparatus as in claim 12, wherein said auxiliary vacuum and filtering system comprises a fan and filter disposed in an end-housing structure adjacent said textile machine, and a second isolation device for isolating said auxiliary fan and filter from said common vacuum system, said fan capable of drawing both said first and second airstreams from said textile machine.

14. An air handling and filtering system for servicing a plurality of textile machines having a row of spinning stations, said system for drawing and filtering two separate airstreams from the textile machines without interrupting the airstream removing generally reusable fiber from adjacent the spinning components of each spinning station, said system comprising:

a centralized filter house, said filter house generally remote from said textile machines, said filter house further comprising a fan in pneumatic communication with said textile machines for drawing said airstreams therefrom, and a first filtering device for filtering generally reusable fiber material from said first airstreams drawn from adjacent the spinning components of said textile machines;

an end-housing unit generally adjacent the end of each said textile machine, said centralized filter house connected by ducting to each said end-housing unit so that said first airstreams are drawn through said end-housing structure to said first filtering device, said fan also drawing second airstreams from said textile machines carrying generally waste fiber material into said respective end-housing units; and a second airstream filter disposed within each said end-housing unit for filtering waste fiber material from said second airstream, and an isolation damper disposed within said end-housing unit for isolating said second airstream filter from said centralized filter house so that during cleaning or maintenance of said second airstream filter, said centralized filter house fan will continuously draw said first airstream from said textile machines.

15. The system as in claim 14, wherein said centralized filter house comprises a drum type filtering system having sufficient capability to service a plurality of said textile machines.

16. The system as in claim 14, further comprising an auxiliary fan and filter housed within said end-housing units of said textile machines, and an isolation damper for selectively isolating said auxiliary fan from said centralized filter housing, said auxiliary fan and filter providing an alternate means for drawing and filtering said first air stream.

17. An air handling and filtering system for use with textile machines of the type having a row of spinning stations, said system providing continuous suction for withdrawing white waste from the textile machine during all phases of operation, said system comprising:

internal ducting for conveying a first airstream and a second independent airstream from said spinning stations, said first airstream being drawn generally from the area of yarn formation at each spinning station and comprising generally white waste fiber material, said second airstream comprising generally waste fiber material;

an exhaust fan pneumatically connected to said internal ducting for drawing said first and second airstreams;

a first airstream filter for filtering said white waste fiber material, and a second airstream filter for filtering said waste fiber material; and an isolation damper for isolating said second airstream filter from said exhaust fan so that said second airstream filter can be serviced without stopping said exhaust fan so that said first airstream is continuously drawn and filtered regardless of the position of said isolation damper so as not to adversely affect yarn formation.

18. The system as in claim 17, further comprising an auxiliary vacuum source and auxiliary first airstream filter for providing alternate continuous drawing and filtering of said first airstream, said auxiliary vacuum source and auxiliary first airstream filter being isolateable from said exhaust fan and said first airstream filter, said auxiliary vacuum source drawing said first and second airstreams and filtering said first airstream if said exhaust fan and first airstream filter are isolated for servicing thereof.

19. The system as in claim 17, wherein said system can be retrofitted to an air spinning textile machine.

20. The system as in claim 17, wherein said system can be retrofitted to a textile machine requiring separate filtering of two essentially independent airstreams drawn therefrom.

21. The system as in claim 17, wherein said exhaust fan, said first airstream filter, said second airstream filter, and said isolation damper are disposed in a housing structure adjacent an end of said textile machine.

22. The system as in claim 18, wherein said auxiliary vacuum source and auxiliary first airstream filter are disposed remote from said textile machine and connected to said housing structure through ducting.

23. A method for separately filtering two independent airstreams from a plurality of textile machines for filtering generally useable fiber material and generally waste fiber material without adversely affecting yarn formation at the textile machine spinning stations, said method comprising the steps of:

drawing first and second independent airstreams through the textile machines with a common vacuum source, the first airstream conveying the useable fiber material and the second airstream conveying the waste fiber material;

filtering the first airstream with a first airstream filter;

separately filtering the second airstream with a separate second airstream filter; and isolating the second airstream filter from the common vacuum source when necessary for servicing the second airstream filter without affecting the first airstream being drawn from the textile machine.

24. The method as in claim 23, further comprising starting an auxiliary fan and isolating the common vacuum source and first airstream filter, the auxiliary fan drawing the first and second airstreams from the textile machine, and filtering the first airstream from an auxiliary filter so that the first airstream filter and common vacuum source can be isolated for servicing thereof without affecting drawing of the first airstream from the textile machine.

* * * * *